(12) United States Patent
Dahley et al.

(10) Patent No.: US 9,538,223 B1
(45) Date of Patent: Jan. 3, 2017

(54) SYNCHRONOUS COMMUNICATION SYSTEM AND METHOD

(71) Applicant: Google Inc., Mountain View, CA (US)

(72) Inventors: Andrew M. Dahley, San Francisco, CA (US); John Patrick Enstrom, San Francisco, CA (US); Anil Sabharwal, Los Altos, CA (US)

(73) Assignee: Google Inc., Mountain View, CA (US)

( * ) Notice: Subject to any disclaimer, the term of this patent is extended or adjusted under 35 U.S.C. 154(b) by 172 days.

(21) Appl. No.: 14/081,154

(22) Filed: Nov. 15, 2013

(51) Int. Cl.
| | |
|---|---|
| *G06F 3/048* | (2013.01) |
| *H04N 21/266* | (2011.01) |
| *G06F 3/0482* | (2013.01) |
| *H04N 7/14* | (2006.01) |
| *G06F 3/01* | (2006.01) |

(52) U.S. Cl.
CPC .......... *H04N 21/266* (2013.01); *G06F 3/0482* (2013.01); *G06F 3/017* (2013.01); *H04N 7/141* (2013.01)

(58) Field of Classification Search
CPC .................... G06F 9/4443; G06F 3/017; G06F 3/048–3/04883; G06F 14/54; H04L 65/403; H04L 12/1822; H04L 12/1827; H04L 67/02; H04N 7/147–7/152; H04N 21/4126; H04N 21/41407; H04N 21/4788; H04N 21/6125
See application file for complete search history.

(56) References Cited

U.S. PATENT DOCUMENTS

| | | | |
|---|---|---|---|
| 7,949,116 B2 | 5/2011 | Swanson | |
| 8,082,003 B2 | 12/2011 | Jee | |
| 8,395,655 B2 | 3/2013 | Robinson et al. | |
| 8,564,618 B2 | 10/2013 | Ryu et al. | |
| 2006/0098085 A1 | 5/2006 | Nichols et al. | |
| 2006/0164508 A1 | 7/2006 | Eshkoli et al. | |
| 2007/0186177 A1* | 8/2007 | Both et al. | 715/764 |
| 2008/0016156 A1 | 1/2008 | Miceli et al. | |
| 2008/0065507 A1 | 3/2008 | Morrison et al. | |
| 2008/0174570 A1* | 7/2008 | Jobs et al. | 345/173 |
| 2009/0054107 A1* | 2/2009 | Feland, III | G06F 3/04883 455/564 |
| 2010/0182248 A1 | 7/2010 | Chun | |
| 2010/0220172 A1 | 9/2010 | Michaelis | |
| 2010/0315484 A1 | 12/2010 | Ramanathan et al. | |
| 2010/0333004 A1* | 12/2010 | Kristiansen et al. | 715/765 |
| 2011/0249073 A1 | 10/2011 | Cranfill et al. | |

(Continued)

FOREIGN PATENT DOCUMENTS

| | | |
|---|---|---|
| WO | 2012149796 A1 | 11/2012 |
| WO | 2013024397 A1 | 2/2013 |

OTHER PUBLICATIONS

Dougherty, J., "How to record & broadcast a video conference with Google+," Nov. 5, 2012, commons. trincoll.edu, pp. 1-2.

*Primary Examiner* — Claudia Dragoescu
(74) *Attorney, Agent, or Firm* — Remarck Law Group PLC

(57) ABSTRACT

A method and computing system for providing, using one or more computing devices, a synchronous communication session for a plurality of users of a social network. A first video stream of a first user of the plurality of users is rendered within a primary viewing field associated with the synchronous communication session. At least a second video stream of at least a second user of the plurality of users is rendered within the primary viewing field associated with the synchronous communication session.

21 Claims, 8 Drawing Sheets

(56) References Cited

U.S. PATENT DOCUMENTS

| | | |
|---|---|---|
| 2011/0270923 A1 | 11/2011 | Jones et al. |
| 2011/0286716 A1 | 11/2011 | Alderson |
| 2012/0122590 A1 | 5/2012 | Nguyen |
| 2012/0182384 A1* | 7/2012 | Anderson et al. ......... 348/14.09 |
| 2012/0215380 A1 | 8/2012 | Fouillade et al. |
| 2012/0262537 A1 | 10/2012 | Baker et al. |
| 2012/0268553 A1 | 10/2012 | Talukder |
| 2012/0290977 A1 | 11/2012 | Devecka |
| 2013/0063542 A1 | 3/2013 | Bhat et al. |
| 2013/0155099 A1 | 6/2013 | Ha et al. |
| 2013/0194378 A1 | 8/2013 | Brown |
| 2013/0198629 A1 | 8/2013 | Tandon et al. |
| 2013/0205408 A1 | 8/2013 | Yerli |
| 2013/0208187 A1 | 8/2013 | Bhogal et al. |
| 2013/0216206 A1 | 8/2013 | Dubin et al. |
| 2013/0231185 A1 | 9/2013 | Steil |
| 2013/0263021 A1 | 10/2013 | Dunn et al. |
| 2014/0036090 A1 | 2/2014 | Black et al. |
| 2014/0267572 A1 | 9/2014 | Bright-Thomas |
| 2014/0368734 A1 | 12/2014 | Hoffert et al. |

\* cited by examiner

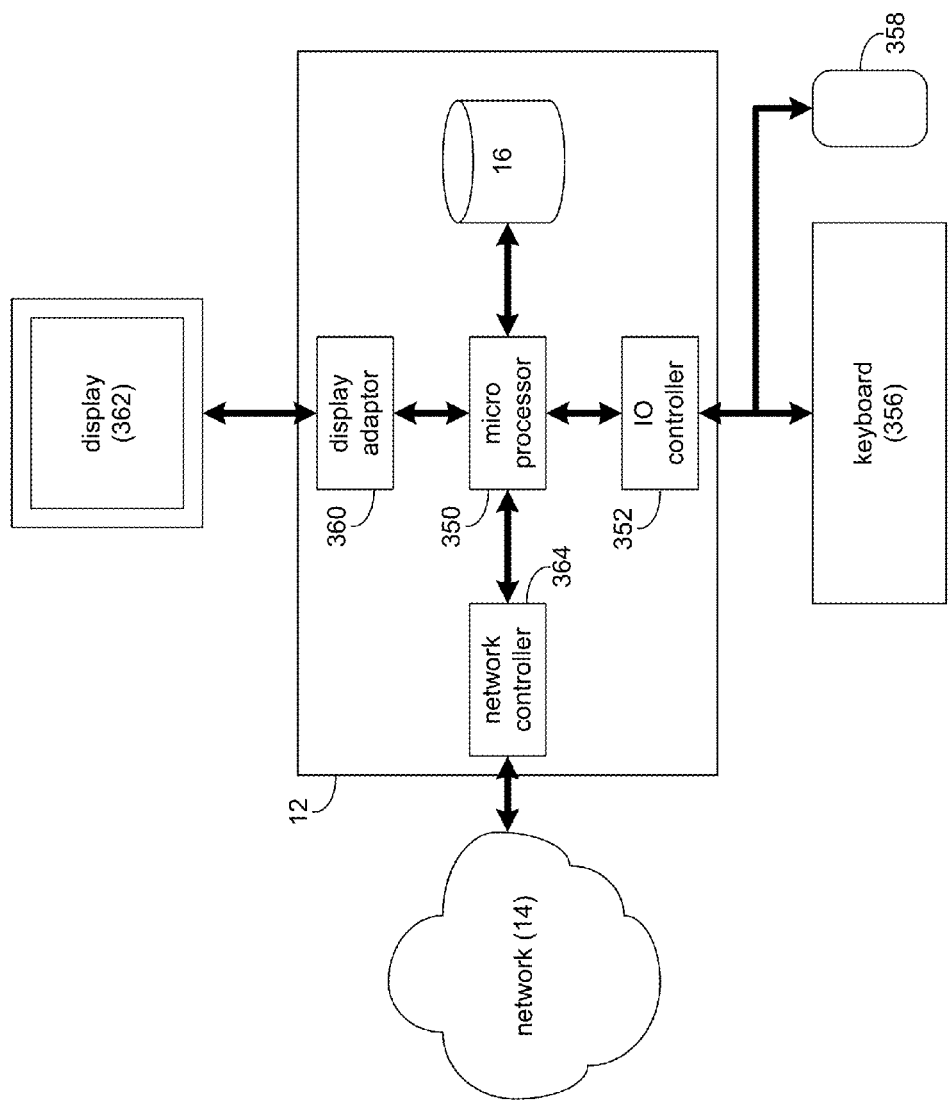

SYNCHRONOUS COMMUNICATION SYSTEM AND METHOD

TECHNICAL FIELD

This disclosure relates to synchronous communication sessions and, more particularly, to the rendering of synchronous communication sessions.

BACKGROUND

The Internet currently allows for the free exchange of ideas and information in a manner that was unimaginable only a couple of decades ago. One such use for the Internet is as a communication medium, whether it is via one-on-one exchanges or multi-party exchanges. For example, two individuals may exchange private emails with each other. Alternatively, multiple people may participate on a public website in which they may post entries that are published for multiple people to read. Examples of such websites may include but are not limited to product/service review sites and topical blogs.

As is known in the art, social networks allow for users to engage in a quasi-real-time, interactive dialogue. Social networking websites have allowed people to interact and socialize in ways that were unimaginable ten years ago. For example, the use of such social networking websites has allowed for long lost friends to be reunited, long-distance friendships to be easily maintained, and information to be broadcast to groups of people.

SUMMARY OF DISCLOSURE

In one implementation, a computer-implemented method includes providing, using one or more computing devices, a synchronous communication session for a plurality of users of a social network. A first video stream of a first user of the plurality of users is rendered within a primary viewing field associated with the synchronous communication session. At least a second video stream of at least a second user of the plurality of users is rendered within the primary viewing field associated with the synchronous communication session. A secondary viewing field, associated with the synchronous communication session, is rendered that includes a plurality of portions. A video stream of the remaining users of the plurality of users is rendered within the plurality of portions of the secondary viewing field.

In another implementation, a computer-implemented method includes providing, using one or more computing devices, a synchronous communication session for a plurality of users of a social network. A first video stream of a first user of the plurality of users is rendered within a primary viewing field associated with the synchronous communication session. At least a second video stream of at least a second user of the plurality of users is rendered within the primary viewing field associated with the synchronous communication session.

One or more of the following features may be included. A swiping gesture may be received proximate the primary viewing field. In response to receiving the swiping gesture, a video stream of one of the remaining users of the plurality of users may be rendered within the primary viewing field.

Receiving a swiping gesture proximate the primary viewing field may include receiving a leftward swiping gesture proximate the primary viewing field. In response to receiving the leftward swiping gesture, a rightward video stream associated with a rightward portion of a secondary viewing field may be rendered within the primary viewing field.

Receiving a swiping gesture proximate the primary viewing field may include receiving a rightward swiping gesture proximate the primary viewing field. In response to receiving the rightward swiping gesture, a leftward video stream associated with a leftward portion of a secondary viewing field may be rendered within the primary viewing field.

A secondary viewing field, associated with the synchronous communication session, may be rendered that includes a plurality of portions. A video stream of the remaining users of the plurality of users may be rendered within the plurality of portions of the secondary viewing field. The primary viewing field may be larger than each of the plurality of portions of the secondary viewing field.

A first placeholder for the first user may be rendered within a first portion of the secondary viewing field while the first video stream is being rendered within the primary viewing field. At least a second placeholder for the at least a second user may be rendered within at least a second portion of the secondary viewing field while the at least a second video stream is being rendered within the primary viewing field.

The first user of the plurality of users may be currently addressing the remaining users of the plurality of users within the synchronous communication session.

In another implementation, a computing system including a processor and memory is configured to perform operations including providing, using one or more computing devices, a synchronous communication session for a plurality of users of a social network. A first video stream of a first user of the plurality of users is rendered within a primary viewing field associated with the synchronous communication session. At least a second video stream of at least a second user of the plurality of users is rendered within the primary viewing field associated with the synchronous communication session.

One or more of the following features may be included. A swiping gesture may be received proximate the primary viewing field. In response to receiving the swiping gesture, a video stream of one of the remaining users of the plurality of users may be rendered within the primary viewing field.

Receiving a swiping gesture proximate the primary viewing field may include receiving a leftward swiping gesture proximate the primary viewing field. In response to receiving the leftward swiping gesture, a rightward video stream associated with a rightward portion of a secondary viewing field may be rendered within the primary viewing field.

Receiving a swiping gesture proximate the primary viewing field may include receiving a rightward swiping gesture proximate the primary viewing field. In response to receiving the rightward swiping gesture, a leftward video stream associated with a leftward portion of a secondary viewing field may be rendered within the primary viewing field.

A secondary viewing field, associated with the synchronous communication session, may be rendered that includes a plurality of portions. A video stream of the remaining users of the plurality of users may be rendered within the plurality of portions of the secondary viewing field. The primary viewing field may be larger than each of the plurality of portions of the secondary viewing field.

A first placeholder for the first user may be rendered within a first portion of the secondary viewing field while the first video stream is being rendered within the primary viewing field. At least a second placeholder for the at least a second user may be rendered within at least a second portion of the secondary viewing field while the at least a second video stream is being rendered within the primary viewing field.

The first user of the plurality of users may be currently addressing the remaining users of the plurality of users within the synchronous communication session.

The details of one or more implementations are set forth in the accompanying drawings and the description below. Other features and advantages will become apparent from the description, the drawings, and the claims.

BRIEF DESCRIPTION OF THE DRAWINGS

FIG. 8 is a diagrammatic view of the computing device of FIG. 1 according to an embodiment of the present disclosure.

Like reference symbols in the various drawings indicate like elements.

DETAILED DESCRIPTION OF THE PREFERRED EMBODIMENTS

System Overview

Figure 1:
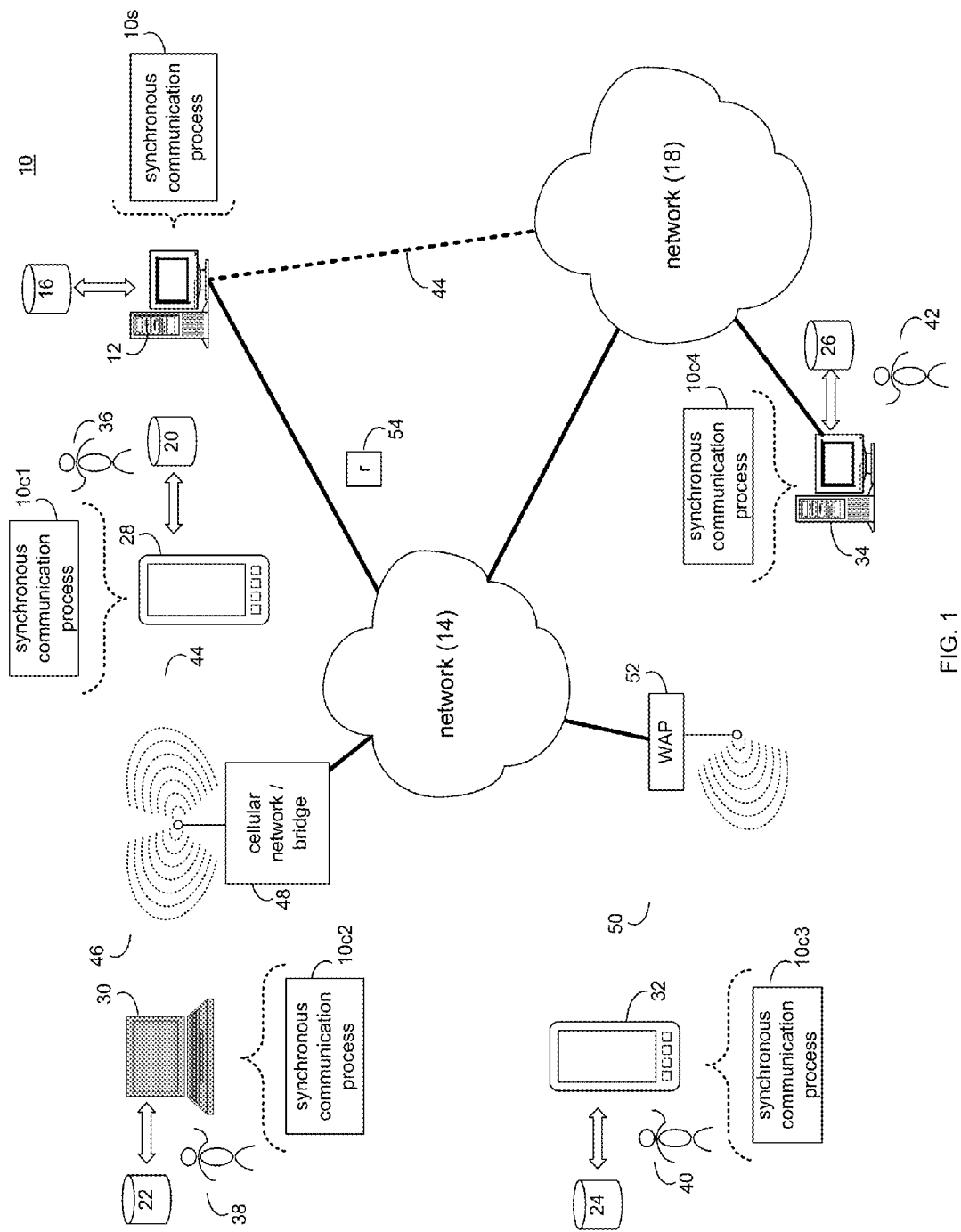
FIG. 1 is a diagrammatic view of a distributed computing network including a computing device that executes a synchronous communication process according to an embodiment of the present disclosure.
Figure 2:
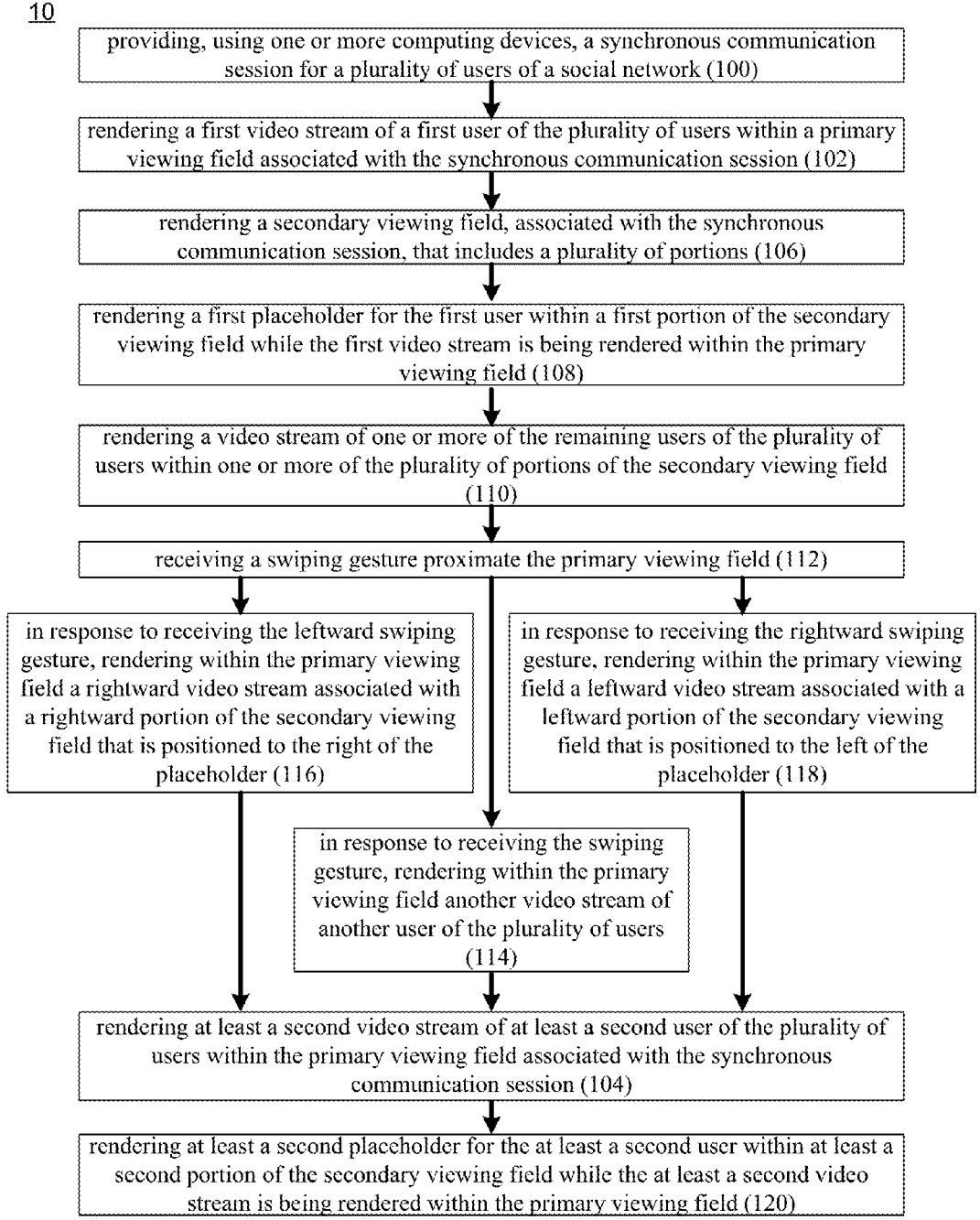
FIG. 2 is a flowchart of the synchronous communication process of FIG. 1 according to an embodiment of the present disclosure.

In FIGS. 1 & 2, there is shown synchronous communication process 10. Synchronous communication process 10 may be implemented as a server-side process, a client-side process, or a hybrid server-side/client-side process. For example, synchronous communication process 10 may be implemented as a purely server-side process via synchronous communication process 10s. Alternatively, synchronous communication process 10 may be implemented as a purely client-side process via one or more of synchronous communication process 10c1, synchronous communication process 10c2, synchronous communication process 10c3, and synchronous communication process 10c4. Alternatively still, synchronous communication process 10 may be implemented as a hybrid server-side/client-side process via synchronous communication process 10s in combination with one or more of synchronous communication process 10c1, synchronous communication process 10c2, synchronous communication process 10c3, and synchronous communication process 10c4. Accordingly, synchronous communication process 10 as used in this disclosure may include any combination of synchronous communication process 10s, synchronous communication process 10c1, synchronous communication process 10c2, synchronous communication process 10c3, and synchronous communication process 10c4.

As will be discussed below in greater detail, synchronous communication process 10 may provide 100 a synchronous communication session for a plurality of users of a social network. Synchronous communication process 10 may render 102a first video stream of a first user of the plurality of users within a primary viewing field associated with the synchronous communication session; and may render 104 at least a second video stream of at least a second user of the plurality of users within the primary viewing field associated with the synchronous communication session.

Synchronous communication process 10s may be a server application and may reside on and may be executed by computing device 12, which may be connected to network 14 (e.g., the Internet or a local area network). Examples of computing device 12 may include, but are not limited to: a personal computer, a laptop computer, a tablet computer, a personal digital assistant, a data-enabled cellular telephone, a notebook computer, a television with one or more processors embedded therein or coupled thereto, a server computer, a series of server computers, a mini computer, a mainframe computer, or a dedicated network device.

The instruction sets and subroutines of synchronous communication process 10s, which may be stored on storage device 16 coupled to computing device 12, may be executed by one or more processors (not shown) and one or more memory architectures (not shown) included within computing device 12. Examples of storage device 16 may include but are not limited to: a hard disk drive; a tape drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Examples of synchronous communication processes 10c1, 10c2, 10c3, 10c4 may include but are not limited to a web browser, a game console user interface, a social network user interface, a video conference user interface, or a specialized application. The instruction sets and subroutines of synchronous communication processes 10c1, 10c2, 10c3, 10c4, which may be stored on storage devices 20, 22, 24, 26 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Examples of storage devices 20, 22, 24, 26 may include but are not limited to: hard disk drives; tape drives; optical drives; RAID devices; random access memories (RAM); read-only memories (ROM), and all forms of flash memory storage devices.

Examples of client electronic devices 28, 30, 32, 34 may include, but are not limited to, data-enabled, cellular telephone 28, laptop computer 30, personal digital assistant 32, personal computer 34, a tablet computer (not shown), a notebook computer (not shown), a server computer (not shown), a gaming console (not shown), and a dedicated network device (not shown). Client electronic devices 28, 30, 32, 34 may each execute an operating system.

Users 36, 38, 40, 42 may access synchronous communication process 10 directly through network 14 or through secondary network 18. Further, synchronous communication process 10 may be connected to network 14 through secondary network 18, as illustrated with link line 44.

The various client electronic devices (e.g., client electronic devices 28, 30, 32, 34) may be directly or indirectly coupled to network 14 (or network 18). For example, data-enabled, cellular telephone 28 and laptop computer 30 are shown wirelessly coupled to network 14 via wireless communication channels 44, 46 (respectively) established between data-enabled, cellular telephone 28, laptop computer 30 (respectively) and cellular network/bridge 48, which is shown directly coupled to network 14. Further, personal digital assistant 32 is shown wirelessly coupled to network 14 via wireless communication channel 50 established between personal digital assistant 32 and wireless access point (i.e., WAP) 52, which is shown directly coupled to network 14. Additionally, personal computer 34 is shown directly coupled to network 18 via a hardwired network connection.

WAP 52 may be, for example, an IEEE 802.11a, 802.11b, 802.11g, 802.11n, Wi-Fi, and/or Bluetooth device that is capable of establishing wireless communication channel 50 between personal digital assistant 32 and WAP 52. As is known in the art, IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

As is known in the art, users of social networks may be able to participate in group communication sessions, such as multiuser video chat sessions that allow for virtual gatherings of people so that they may chat about various topics.

Specifically and as will be discussed below in greater detail, synchronous communication process 10 may be configured to provide 100 a synchronous communication session for a plurality of users of a social network. A first video stream of a first user (of the plurality of users) may be rendered 102 within a primary viewing field associated with the synchronous communication session. At least a second video stream of at least a second user (of the plurality of users) may be rendered 104 within this primary viewing field. This primary viewing field may be a larger viewing field that may be positioned within a dominant portion of the viewing screen. Placeholders for the first user and the at least a second user (of the plurality of users) may be rendered within a secondary viewing field associated with the synchronous communication session. Examples of these placeholders may include but are not limited to a) information concerning the first user, b) a reduced-scale version of the video stream of the first user, and c) a partially-obscured, reduced-scale version of the video stream of the first user. The second secondary viewing field may include a plurality of portions, within which these placeholders and the video streams of the remaining users of the synchronous communication session may be rendered.

Synchronous Communication Process

Figure 3:
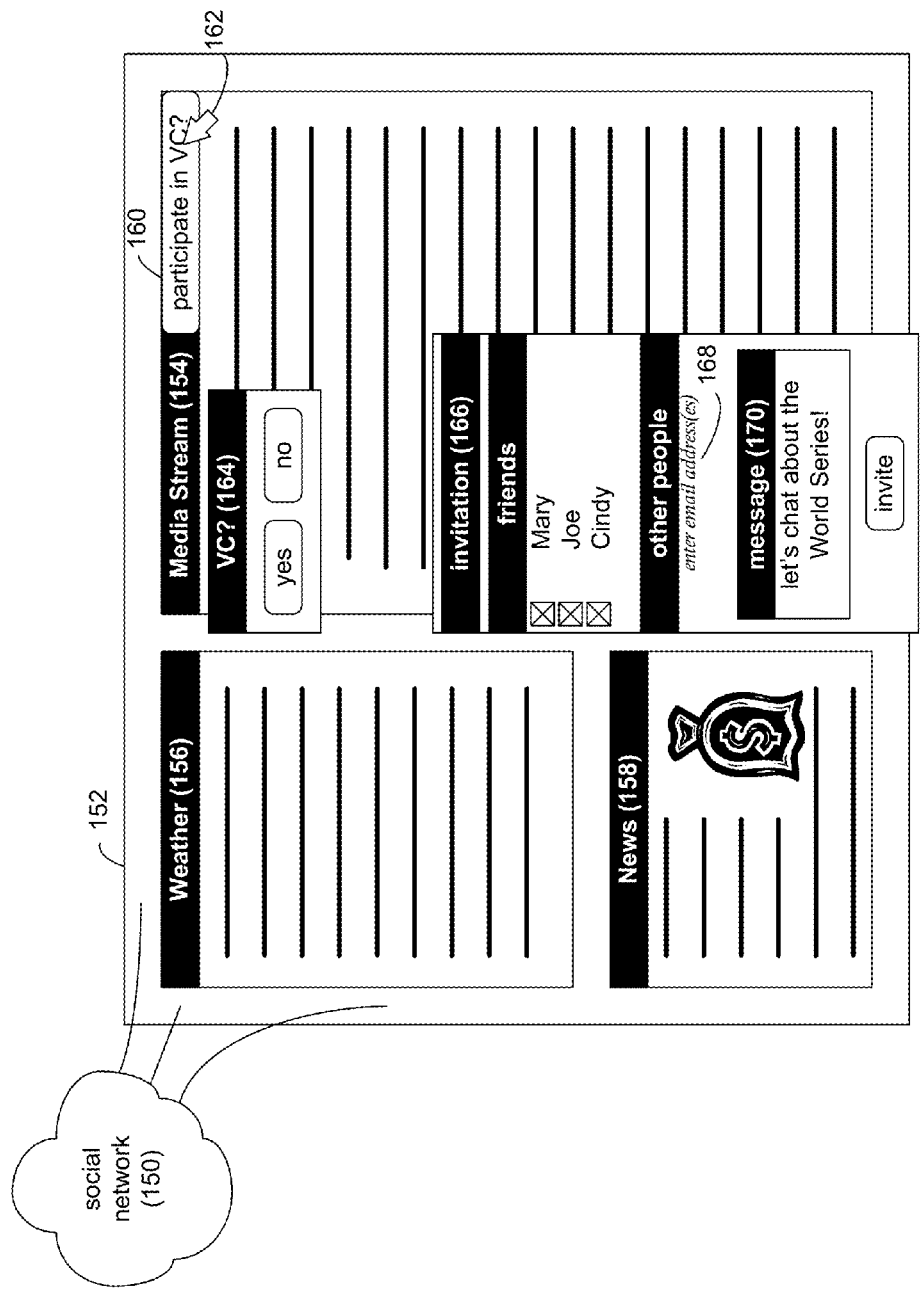
FIG. 3 is a diagrammatic view of a display screen rendered by the synchronous communication process of FIG. 1 according to an embodiment of the present disclosure.

Referring also to FIG. 3, synchronous communication process 10 may be included within, executed within, or a portion of a social network (e.g., social network 150). Social network 150 may include graphical user interface 152, which may be divided into a plurality of sections, such as media stream 154, weather 156 and news 158.

Assume for illustrative purposes that user 36 (i.e. Mark) is an avid baseball fan and is looking forward to the upcoming World Series, and that Mary (user 38), Joe (user 40), and Cindy (user 42) are also baseball fans. Further assume for illustrative purposes that user 36, 38, 40, 42 wish to participate in a synchronous communication session (e.g., a video conference) so that they may discuss the upcoming World Series. Accordingly, user 36 may select e.g., participate in VC button 160 using onscreen pointer 162 (which is controllable via a mouse, not shown). Alternatively and if the client electronic device includes a touch screen, user 36 may select e.g., participate in VC button 160 by tapping on the same.

Upon user 36 making this selection, synchronous communication process 10 may render VC confirmation window 164 that may allow users 36 to confirm that they wish to participate in a synchronous communication session (e.g., a video conference) concerning e.g., the upcoming World Series. For example, if user 36 wishes to participate in a synchronous communication session, user 36 may select the "yes" button included within VC confirmation window 164. Alternatively, if user 36 does not wish to participate in such a synchronous communication session, user 36 may select the "no" button included within VC confirmation window 164.

Figure 4:
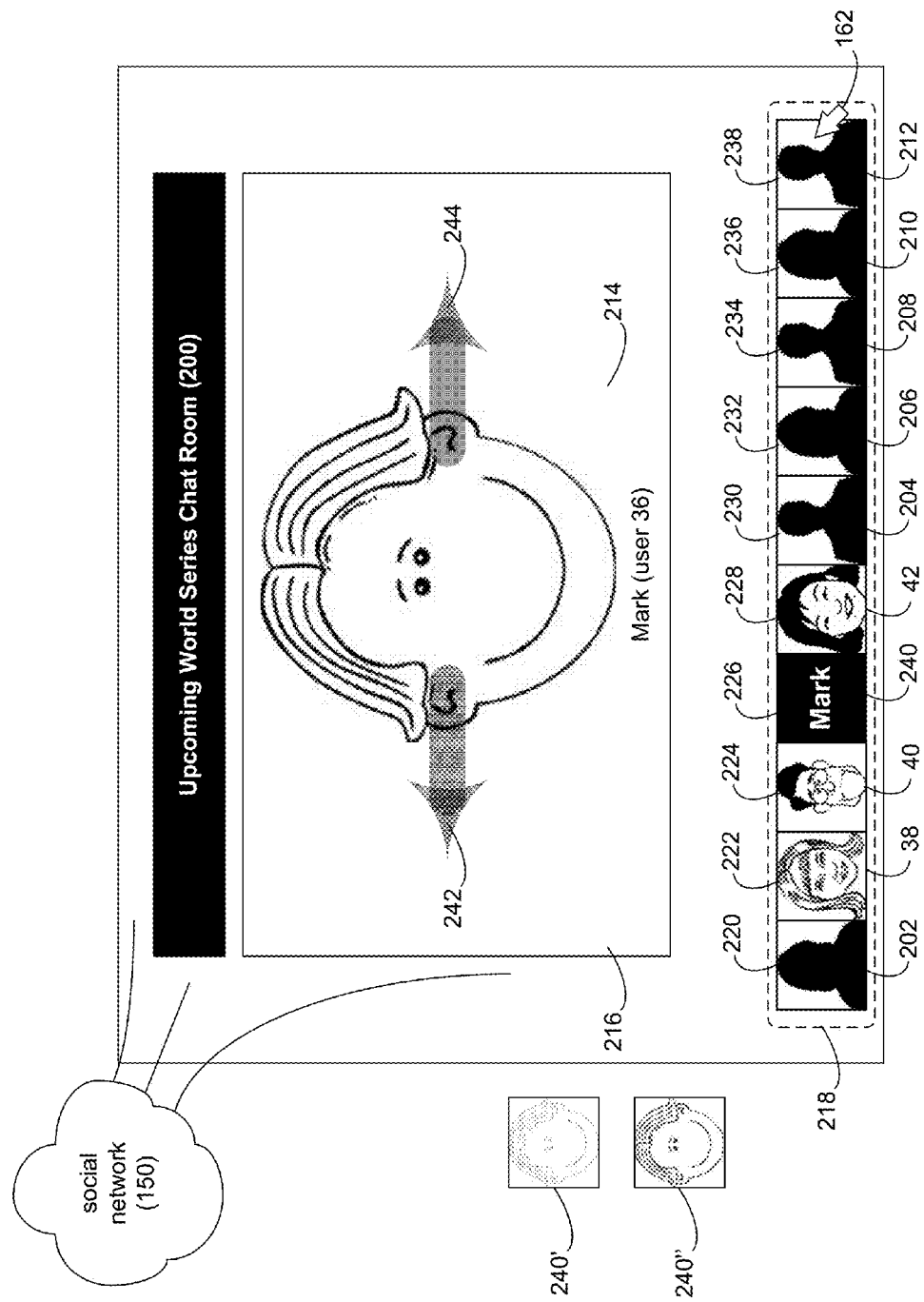
FIG. 4 is a diagrammatic view of another display screen rendered by the synchronous communication process of FIG. 1 according to an embodiment of the present disclosure.

Referring also to FIG. 4, assume for illustrative purposes that user 36 wishes to participate in such a synchronous communication session (e.g., synchronous communication session 200) concerning e.g., the upcoming World Series. Accordingly, user 36 may select the "yes" button included within VC confirmation window 164, resulting in the rendering of invitation window 166 that may be configured to allow user 36 to identify invitee(s) for synchronous communication session 200 (e.g., the video conference).

Invitation window 166 may be configured to allow user 36 to invite various types of individuals to synchronous communication session 200. For example, invitation window 166 may be configured to identify members of social network 150 that are friends with/connected to user 36. For example, assume that user 36 is friends with Mary (user 38), Joe (user 40), and Cindy (user 42). As users 38, 40, 42 wish to participate in synchronous communication session 200, user 36 may check the appropriate check box next to the name of each of these users.

Additionally, invitation window 166 may be configured to allow user 36 to invite people that are not members of social network 150. Accordingly, user 36 may populate email field 168 with the email address(es) of people that that they wish to invite to join synchronous communication session 200 but are currently not members of social network 150.

Invitation window 166 may include message field 170 that may allow user 36 to define a text-based comment concerning synchronous communication session 200. For example, user 36 may add the comment "let's chat about the World Series!". Accordingly, the text-based comment may be used as a descriptor for synchronous communication session 200.

Once the appropriate people are identified within invitation window 166, user 36 may select (e.g., via onscreen pointer 162 or a tap command) the "invite" button included within invitation window 166 and synchronous communication process 10 may notify users 38, 40, 42 that user 36 wishes to have a video conference (e.g., synchronous communication session 200) concerning the upcoming World Series. If a person notified about synchronous communication session 200 is not a member of social network 150, that person may first be asked to join social network 150 and, upon joining social network 150, may be allowed to participate in synchronous communication session 200.

While the following discussion concerns synchronous communication session 200 being an audio-video, synchronous communication session, this is for illustrative purposes only and is not intended to be a limitation of this disclosure, as other configurations are possible (e.g., a multi-user, video conference that includes one or more audio-only participants) and are considered to be within the scope of this disclosure.

Synchronous communication process 10 may provide 100 synchronous communication session 200 for a plurality of users (e.g., users 36, 38, 40, 42) of social network 150. Assume for illustrative purposes that additional users are also participating in synchronous communication session 200, namely users 202, 204, 206, 208, 210, 212.

Synchronous communication process 10 may be configured to provide visual prominence to the user that is currently speaking within synchronous communication session 200. Assume for illustrative purposes that when synchronous communication session 200 is started, user 36 leads off the discussion concerning the upcoming World Series. Accordingly, synchronous communication process 10 may provide visual prominence to user 36, as user 36 is currently addressing the remaining users (e.g., users 38, 40, 42, 202, 204, 206, 208, 210, 212) of the plurality of users within synchronous communication session 200. Therefore, synchronous communication process 10 may render 102 a first video stream (e.g., video stream 214) of a first user (e.g., user 36) of the plurality of users (e.g., users 36, 38, 40, 42, 202, 204, 206, 208, 210, 212) within a primary viewing field (e.g., primary viewing field 216) associated with synchronous communication session 200. Whenever one of the other users (e.g., users 38, 40, 42, 202, 204, 206, 208, 210, 212) speaks within synchronous communication session 200, synchronous communication process 10 may be configured to automatically position the video stream associated with the speaking user within primary viewing field 216.

Synchronous communication process 10 may render 106 secondary viewing field 218 associated with synchronous communication session 200, which may include a plurality of portions (e.g., one for each of the participants of synchronous communication session 200). While in this particular example, secondary viewing field 218 is shown to include ten portions (namely portions 220, 222, 224, 226, 228, 230, 232, 234, 236, 238), this is for illustrative purposes only and is not intended to be a limitation of this disclosure, as other configurations are possible and are considered to be within the scope of this disclosure. Specifically, the quantity of portions included within secondary viewing field 218 may be increased/decreased depending on the number of users participating in synchronous communication session 200.

Since and as discussed above, synchronous communication process 10 may provide visual prominence to the user that is currently addressing the remaining users within synchronous communication session 200, primary viewing field 216 may be larger than each of the plurality of portions (namely portions 220, 222, 224, 226, 228, 230, 232, 234, 236, 238) included within the secondary viewing field 218.

Synchronous communication process 10 may render 108 a placeholder (e.g., placeholder 240) for the first user (e.g., user 36 who is currently speaking) of the plurality of users (e.g., users 36, 38, 40, 42, 202, 204, 206, 208, 210, 212) within a first portion (e.g., portion 226) of secondary viewing field 218. Placeholder 240 may be rendered 108 while the first video stream (e.g., video stream 214) is being rendered within primary viewing field 216.

Placeholder 240 for the first user (e.g., user 36) of the plurality of users (e.g., users 36, 38, 40, 42, 202, 204, 206, 208, 210, 212) may include information concerning the first user (e.g., user 36), that is the user who is currently speaking. Examples of such information may include but is not limited to one or more of: identification information for the first user (e.g., user 36), such as name and title; and/or contact information for the first user (e.g., user 36), such as an email address, a mailing address, a home phone number, an office phone number, a cell phone number, a social network user name, or a webpage.

Alternatively, placeholder 240 for the first user (e.g., user 36) of the plurality of users (e.g., users 36, 38, 40, 42, 202, 204, 206, 208, 210, 212) may include a partially-obscured, reduced-scale version of the video stream (e.g., video stream 214) of the first user (e.g., user 36). An example of such a partially-obscured, reduced-scale version of the video stream (e.g., video stream 214) of user 36 may include but is not limited to a grayed-out version (e.g., alternate placeholder 240') of the video stream (e.g., video stream 214).

Alternatively still, placeholder 240 for the first user (e.g., user 36) of the plurality of users (e.g., users 36, 38, 40, 42, 202, 204, 206, 208, 210, 212) may include a reduced-scale version of the video stream of the video stream (e.g., video stream 214) of the first user (e.g., user 36). An example of such a reduced-scale version of the video stream (e.g., video stream 214) of user 36 may include but is not limited to a smaller version (e.g., alternate placeholder 240") of the video stream (e.g., video stream 214).

Further, synchronous communication process 10 may render 110 a video stream of the remaining users of the plurality of users (e.g., users 38, 40, 42, 202, 204, 206, 208, 210, 212) within the plurality of portions of secondary viewing field 218. Specifically: a video stream for user 202 may be rendered 110 within portion 220 of secondary viewing field 218; a video stream for user 38 may be rendered 110 within portion 222 of secondary viewing field 218; a video stream for user 40 may be rendered 110 within portion 224 of secondary viewing field 218; a video stream for user 42 may be rendered 110 within portion 228 of secondary viewing field 218; a video stream for user 204 may be rendered 110 within portion 230 of secondary viewing field 218; a video stream for user 206 may be rendered 110 within portion 232 of secondary viewing field 218; a video stream for user 208 may be rendered 110 within portion 234 of secondary viewing field 218; a video stream for user 210 may be rendered 110 within portion 236 of secondary viewing field 218; and a video stream for user 212 may be rendered 110 within portion 238 of secondary viewing field 218.

In the event that a user wishes to change the video stream that synchronous communication process 10 is currently rendering 102 within primary viewing field 216, the user may make a swiping gesture (e.g., swiping gesture 242, 244) proximate primary viewing field 216 to effectuate the change.

Upon receiving 112 this swiping gesture (e.g., swiping gesture 242, 244) proximate primary viewing field 216, synchronous communication process 10 may render 114 within primary viewing field 216 a video stream of one of the remaining users (of the plurality of users) participating in synchronous communication session 200.

Figure 5:
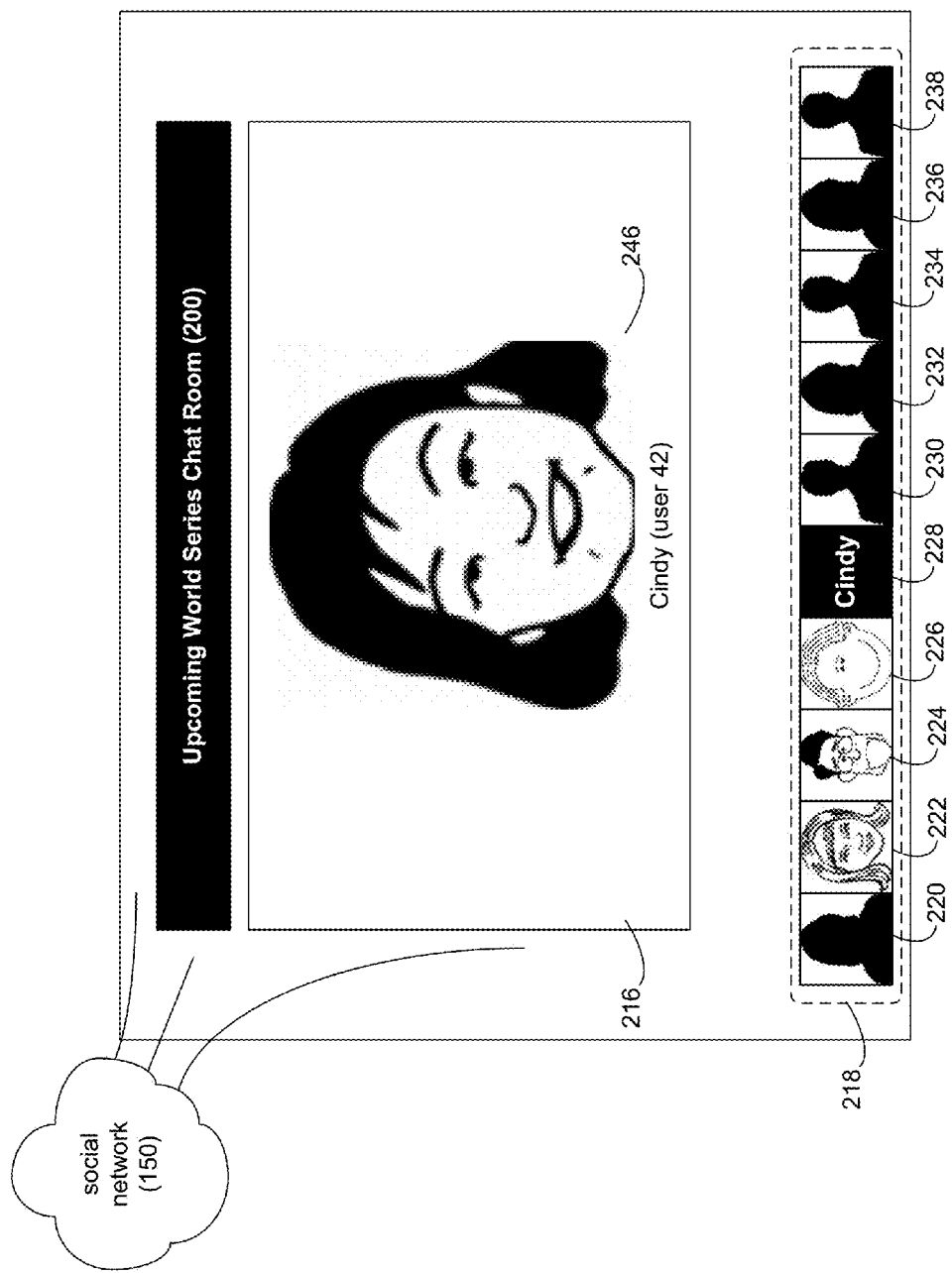
FIG. 5 is a diagrammatic view of another display screen rendered by the synchronous communication process of FIG. 1 according to an embodiment of the present disclosure.

Referring also to FIG. 5 and if the swiping gesture received 112 is a leftward swiping gesture (e.g., swiping gesture 242), synchronous communication process 10 may render 116 within primary viewing field 216 rightward video stream 246 associated with a rightward portion (e.g., portion 228) of secondary viewing field 218 that is positioned to the right of placeholder 240 (which is positioned within portion 226), resulting in the video stream (e.g., rightward video stream 246) associated with Cindy (User 42) being rendered within primary viewing field 216. Portion 228 of secondary viewing field 218 may be undated to include a placeholder for Cindy (User 42).

Figure 6:
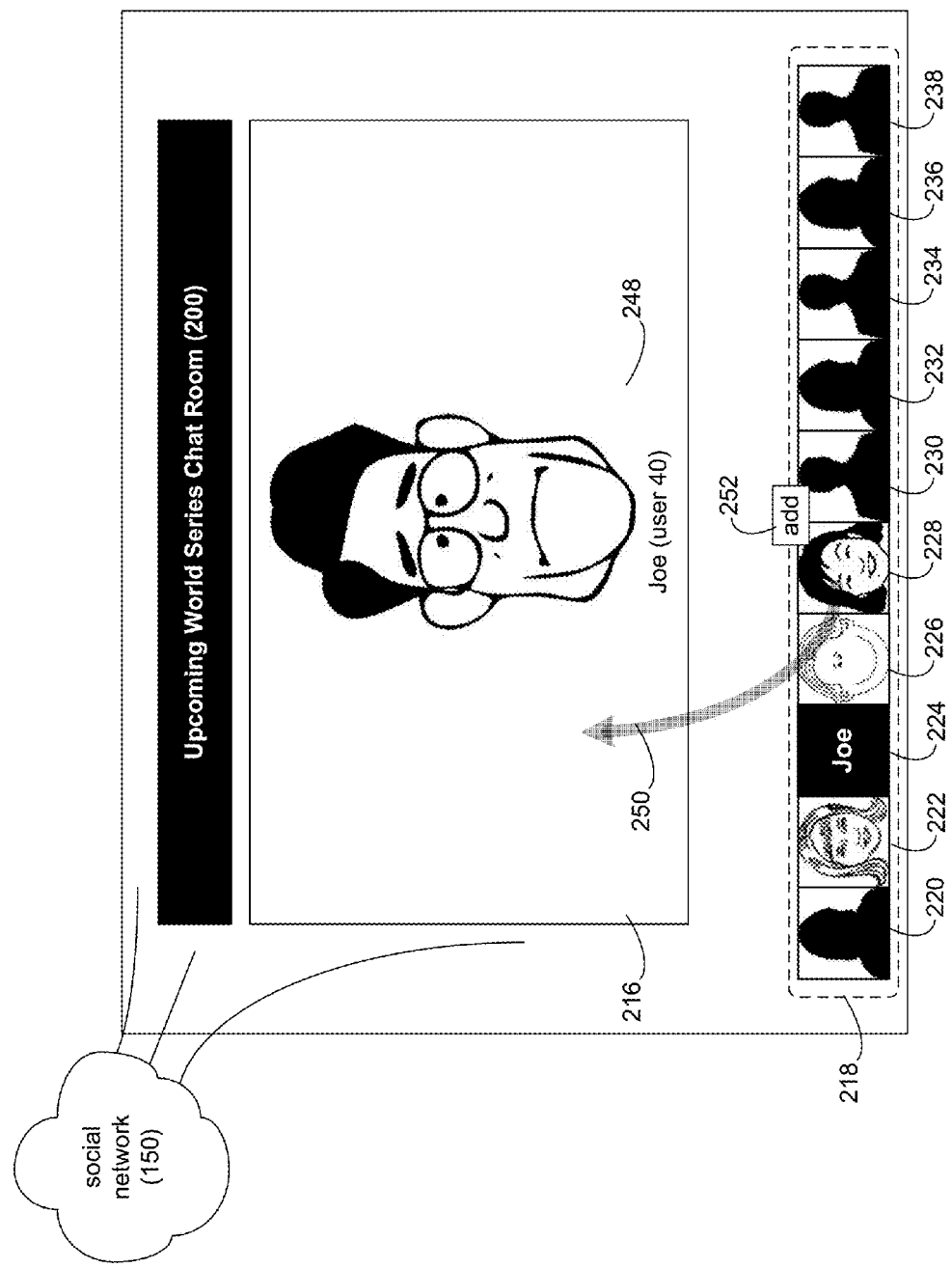
FIG. 6 is a diagrammatic view of another display screen rendered by the synchronous communication process of FIG. 1 according to an embodiment of the present disclosure.

Referring also to FIG. 6 and if the swiping gesture received 112 is a rightward swiping gesture (e.g., swiping gesture 244), synchronous communication process 10 may render 118 within primary viewing field 216 leftward video stream 248 associated with a leftward portion (e.g., portion 224) of secondary viewing field 218 that is positioned to the left of placeholder 240 (which is positioned within portion 226), resulting in the video stream (e.g., leftward video stream 248) associated with Joe (User 40) being rendered within primary viewing field 216. Portion 224 of secondary viewing field 218 may be undated to include a placeholder for Joe (User 40).

In the event that (in this example) a user of synchronous communication process 10 wishes to simultaneously view additional participants of synchronous communication session 200 within primary viewing field 216, synchronous communication process 10 may be configured to allow for the same. For example, assume that user 36 would like to simultaneously view the video streams of user 40 (namely video stream 248) and user 42 (namely video stream 246) within primary viewing field 216 (as they are involved in a "heated" debate about the World Series).

Accordingly, since (in this example) video stream 248 of user 40 is currently being rendered within primary viewing field 216, user 36 may perform an operation to indicate their intent to also render video stream 246 of user 42 within primary viewing field 216. For example, user 36 may drag the video stream of user 42 that is currently being rendered within portion 228 of secondary viewing field 218 into primary viewing field 216 (as represented by arrow 250), resulting in video stream 246 of user 42 being rendered within primary viewing field 216. Alternatively, user 36 may hover over/tap on portion 228 of secondary viewing field 218, resulting in the generation of "add" submenu 252, which (if selected by user 36) may result in video stream 246 of user 42 being rendered within primary viewing field 216.

Figure 7:
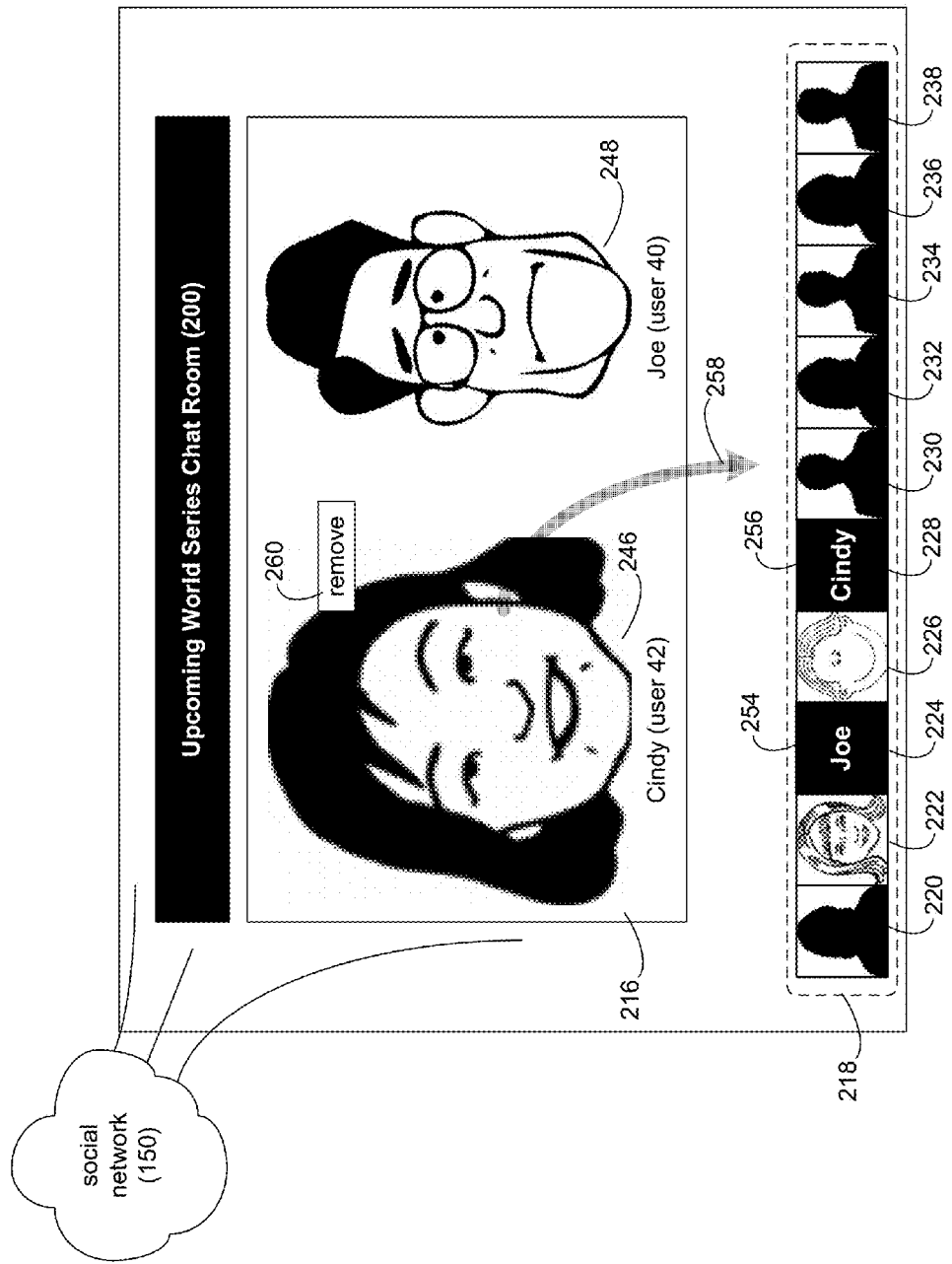
FIG. 7 is a diagrammatic view of another display screen rendered by the synchronous communication process of FIG. 1 according to an embodiment of the present disclosure.

Accordingly and referring also to FIG. 7, upon receiving such an indication by e.g., user 36, synchronous communication process 10 may render 104 at least a second video stream (e.g., video stream 246) of at least a second user (e.g., user 42) of the plurality of users within primary viewing field 216 associated with synchronous communication session 200 (in addition to e.g., video stream 248 of user 40).

When rendering multiple video streams within primary viewing field 216, synchronous communication process 10 may render multiple placeholders within secondary viewing field 218 (e.g., one for each video stream being rendered within primary viewing field 216). For example, synchronous communication process 10 may render 108 a first placeholder (e.g., placeholder 254) for the first user (e.g., user 40) within a first portion (e.g., portion 224) of secondary viewing field 218 while the first video stream (e.g., video stream 248) is being rendered within primary viewing field 216. Additionally, synchronous communication process 10 may render 120 at least a second placeholder (e.g., placeholder 256) for the at least a second user (e.g., user 42) within at least a second portion (e.g., portion 228) of secondary viewing field 218 while the at least a second video stream (e.g., video stream 246) is being rendered within primary viewing field 216.

Synchronous communication process 10 may be configured to allow for swiping gestures to be received 112 and processed while multiple video streams (e.g., video streams 246, 248) are being rendered 102, 104 within primary viewing field 216, thus allowing e.g., user 36 to change/select the video streams rendered within primary viewing field 216. While (in this example) primary viewing field 216 is shown to include two video streams (e.g., video streams 246, 248), this is for illustrative purposes only and is not intended to be a limitation of this disclosure, as other configurations are possible. For example, synchronous communication process 10 may be configured to allow for three or more video streams to be rendered within primary viewing field 216.

In the event that e.g., user 36 wishes to revert back to rendering a single video stream within primary viewing field 216, user 36 may perform an operation to indicate the same. For example, user 36 may drag the video stream (e.g., video stream 246) of user 42 from primary viewing field 216 to secondary viewing field 218 (as represented by arrow 258). Alternatively, user 36 may hover over/tap on video stream 246, resulting in the generation of "remove" submenu 260, which (if selected by user 36) may result in video stream 246 of user 42 being removed within primary viewing field 216.

General

Referring also to FIG. 8, there is shown a diagrammatic view of computing system 12. While computing system 12 is shown in this figure, this is for illustrative purposes only and is not intended to be a limitation of this disclosure, as other configuration are possible. For example, any computing device capable of executing, in whole or in part, synchronous communication process 10 may be substituted for computing device 12 within FIG. 7, examples of which may include but are not limited to client electronic devices 28, 30, 32, 34.

Computing system 12 may include microprocessor 350 configured to e.g., process data and execute instructions/code for synchronous communication process 10. Microprocessor 350 may be coupled to storage device 16. As discussed above, examples of storage device 16 may include but are not limited to: a hard disk drive; a tape drive; an optical drive; a RAID device; an NAS device, a Storage Area Network, a random access memory (RAM); a read-only memory (ROM); and all forms of flash memory storage devices. IO controller 352 may be configured to couple microprocessor 350 with various devices, such as keyboard 356, mouse 358, USB ports (not shown), and printer ports (not shown). Display adaptor 360 may be configured to couple display 362 (e.g., a CRT or LCD monitor) with microprocessor 350, while network adapter 364 (e.g., an Ethernet adapter) may be configured to couple microprocessor 350 to network 14 (e.g., the Internet or a local area network).

As will be appreciated by one skilled in the art, the present disclosure may be embodied as a method (e.g., executing in whole or in part on computing device 12), a system (e.g., computing device 12), or a computer program product (e.g., encoded within storage device 16). Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium (e.g., storage device 16) having computer-usable program code embodied in the medium.

Any suitable computer usable or computer readable medium (e.g., storage device 16) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor (e.g., processor 350) of a general purpose computer/special purpose computer/other programmable data processing apparatus (e.g., computing device 12), such that the instructions, which execute via the processor (e.g., processor 350) of the computer or other programmable data processing apparatus, create means for implementing the functions/acts specified in the flowchart and/or block diagram block or blocks.

These computer program instructions may also be stored in a computer-readable memory (e.g., storage device 16) that may direct a computer (e.g., computing device 12) or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer (e.g., computing device 12) or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising:
providing, using one or more computing devices, a synchronous communication session for a plurality of participants;
rendering a primary viewing field associated with the synchronous communication session that includes a first video stream of a first participant of the plurality of participants;
rendering a secondary viewing field associated with the synchronous communication session that includes a placeholder associated with each of the plurality of participants;
receiving an input from a particular participant of the plurality of participants via the secondary viewing field, the input corresponding to an indication that the particular participant desires to view a second video stream associated with a second participant simultaneously with the first video stream in the primary viewing field; and
in response to receiving the input, simultaneously rendering the first and second video streams within the primary viewing field associated with the synchronous communication session,
wherein a first placeholder associated with the first participant and a second placeholder associated with the second participant are included in the secondary viewing field simultaneously with the first and second video streams being rendered within the primary viewing field.

2. The computer-implemented method of claim 1, wherein the primary viewing field is larger than the secondary viewing field.

3. The computer-implemented method of claim 1, further comprising:
receiving a second input from the particular participant of the plurality of participants via the primary viewing field, the second input corresponding to an indication that the particular participant desires to remove the second video stream from the primary viewing field associated with the synchronous communication session; and
in response to receiving the second input, removing the second video stream from the primary viewing field associated with the synchronous communication session.

4. The computer-implemented method of claim 1, wherein each placeholder: (i) corresponds to a corresponding participant, and (ii) comprises identification information concerning the corresponding participant.

5. The computer-implemented method of claim 4, wherein the identification information comprises at least one of a name, a title, contact information, an email address, a mailing address, a home phone number, an office phone number, a cell phone number, a social network user name, a webpage, and a reduced version of a video stream of the corresponding participant.

6. The computer-implemented method of claim 1, further comprising:
receiving a swiping gesture from the particular participant via the primary viewing field; and
in response to receiving the swiping gesture, switching the primary viewing field such that that another video stream of another participant of the plurality of participants replaces the first video stream of a first participant.

7. A computing system including one or more processors and memory configured to perform operations comprising:
providing a synchronous communication session for a plurality of participants;
rendering a primary viewing field associated with the synchronous communication session that includes a first video stream of a first participant of the plurality of participants;
rendering a secondary viewing field associated with the synchronous communication session that includes a placeholder associated with each of the plurality of participants;
receiving an input from a particular participant of the plurality of participants via the secondary viewing field, the input corresponding to an indication that the particular participant desires to view a second video stream associated with a second participant simultaneously with the first video stream in the primary viewing field; and
in response to receiving the input, simultaneously rendering the first and second video streams within the primary viewing field associated with the synchronous communication session,
wherein a first placeholder associated with the first participant and a second placeholder associated with the second participant are included in the secondary viewing field simultaneously with the first and second video streams being rendered within the primary viewing field.

8. The computing system of claim 7, wherein the primary viewing field is larger than the secondary viewing field.

9. The computing system of claim 7, wherein the operations further comprise:
receiving a second input from the particular participant of the plurality of participants via the primary viewing field, the second input corresponding to an indication that the particular participant desires to remove the second video stream from the primary viewing field associated with the synchronous communication session; and
in response to receiving the second input, removing the second video stream from the primary viewing field associated with the synchronous communication session.

10. The computing system of claim 7, wherein each placeholder: (i) corresponds to a corresponding participant, and (ii) comprises identification information concerning the corresponding participant.

11. The computing system of claim 10, wherein the identification information comprises at least one of a name, a title, contact information, an email address, a mailing address, a home phone number, an office phone number, a cell phone number, a social network user name, a webpage, and a reduced version of a video stream of the corresponding participant.

12. The computing system of claim 7, wherein the operations further comprise:
receiving a swiping gesture from the particular participant via the primary viewing field; and
in response to receiving the swiping gesture, switching the primary viewing field such that that another video stream of another participant of the plurality of participants replaces the first video stream of a first participant.

13. A non-transitory computer-readable medium comprising instructions that, when executed by one or more processors, cause the one or more processors to perform operations comprising:

providing a synchronous communication session for a plurality of participants;

rendering a primary viewing field associated with the synchronous communication session that includes a first video stream of a first participant of the plurality of participants;

rendering a secondary viewing field associated with the synchronous communication session that includes a placeholder associated with each of the plurality of participants;

receiving an input from a particular participant of the plurality of participants via the secondary viewing field, the input corresponding to an indication that the particular participant desires to view a second video stream associated with a second participant simultaneously with the first video stream in the primary viewing field; and in response to receiving the input, simultaneously rendering the first and second video streams within the primary viewing field associated with the synchronous communication session, wherein a first placeholder associated with the first participant and a second placeholder associated with the second participant are included in the secondary viewing field simultaneously with the first and second video streams being rendered within the primary viewing field.

14. The non-transitory computer-readable medium of claim 13, wherein the primary viewing field is larger than the secondary viewing field.

15. The non-transitory computer-readable medium of claim 13, wherein the operations further comprise:

receiving a second input from the particular participant of the plurality of participants via the primary viewing field, the second input corresponding to an indication that the particular participant desires to remove the second video stream from the primary viewing field associated with the synchronous communication session; and in response to receiving the second input, removing the second video stream from the primary viewing field associated with the synchronous communication session.

16. The non-transitory computer-readable medium of claim 13, wherein each placeholder: (i) corresponds to a corresponding participant, and (ii) comprises identification information concerning the corresponding participant.

17. The non-transitory computer-readable medium of claim 16, wherein the identification information comprises at least one of a name, a title, contact information, an email address, a mailing address, a home phone number, an office phone number, a cell phone number, a social network user name, a webpage, and a reduced version of a video stream of the corresponding participant.

18. The non-transitory computer-readable medium of claim 13, wherein the operations further comprise:

receiving a swiping gesture from the particular participant via the primary viewing field; and in response to receiving the swiping gesture, switching the primary viewing field such that that another video stream of another participant of the plurality of participants replaces the first video stream of a first participant.

19. The computer-implemented method of claim 1, wherein each placeholder: (i) corresponds to a corresponding participant, and (ii) comprises a reduced version of a video stream of the corresponding participant.

20. The computing system of claim 7, wherein each placeholder: (i) corresponds to a corresponding participant, and (ii) comprises a reduced version of a video stream of the corresponding participant.

21. The non-transitory computer-readable medium of claim 13, wherein each placeholder: (i) corresponds to a corresponding participant, and (ii) comprises a reduced version of a video stream of the corresponding participant.

* * * * *